US011923621B2

(12) United States Patent
Wu et al.

(10) Patent No.: US 11,923,621 B2
(45) Date of Patent: Mar. 5, 2024

(54) RADIO-FREQUENCY MODULES HAVING HIGH-PERMITTIVITY ANTENNA LAYERS

(71) Applicant: Apple Inc., Cupertino, CA (US)

(72) Inventors: Jiangfeng Wu, San Jose, CA (US); Siwen Yong, Mountain View, CA (US); Simon G. Begashaw, Santa Clara, CA (US); Yi Jiang, Cupertino, CA (US); Lijun Zhang, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/338,463

(22) Filed: Jun. 3, 2021

(65) Prior Publication Data

US 2022/0393351 A1 Dec. 8, 2022

(51) Int. Cl.
*H01Q 5/35* (2015.01)
*H01Q 3/34* (2006.01)

(52) U.S. Cl.
CPC ................ *H01Q 5/35* (2015.01); *H01Q 3/34* (2013.01)

(58) Field of Classification Search
CPC H01Q 5/35; H01Q 3/34; H01Q 1/243; H01Q 1/38; H01Q 1/40
See application file for complete search history.

(56) References Cited

U.S. PATENT DOCUMENTS

| | | | |
|---|---|---|---|
| 5,872,534 | A | 2/1999 | Mayer |
| 6,075,485 | A | 6/2000 | Lilly et al. |
| 6,496,147 | B1 | 12/2002 | Kirino |
| 7,626,547 | B2 | 12/2009 | Schillmeier et al. |
| 7,800,542 | B2 | 9/2010 | Li et al. |
| 8,564,472 | B2 | 10/2013 | Okamura et al. |
| 8,643,184 | B1 | 2/2014 | Zhang et al. |
| 8,659,913 | B2 | 2/2014 | van Dijk et al. |
| 8,766,855 | B2 | 7/2014 | Biglarbegian et al. |
| 9,629,112 | B2 | 4/2017 | Bauchot et al. |
| 9,692,112 | B2 | 6/2017 | Ying et al. |
| 9,773,742 | B2 | 9/2017 | Kamgaing et al. |
| 10,594,028 | B2 | 3/2020 | Yong et al. |
| 2002/0057222 | A1 | 5/2002 | McKinzie et al. |
| 2011/0133978 | A1 | 6/2011 | Sim |
| 2016/0294068 | A1 | 10/2016 | Djerafi et al. |
| 2018/0182525 | A1 | 6/2018 | Sprentall et al. |
| 2018/0205155 | A1 | 7/2018 | Mizunuma et al. |

(Continued)

*Primary Examiner* — Dieu T Duong
(74) *Attorney, Agent, or Firm* — Treyz Law Group, P.C.; Michael H. Lyons; Tianyi He

(57) ABSTRACT

An electronic device may be provided with a phased antenna array on an antenna module. The array may include low band antennas and high band antennas that radiate at frequencies greater than 10 GHz. The module may include antenna layers, transmission line layers, and ground traces that separate the antenna layers from the transmission line layers. The low band antennas and the high band antennas may have radiators patterned onto the antenna layers. The radiators may be fed by transmission lines on the transmission line layers. The antenna layers may have a dielectric permittivity that is greater than the dielectric permittivity of the transmission line layers. This may serve to reduce the lateral footprint of the low band and high band antennas, which allows the antennas to be interleaved along a common linear axis in the phased antenna array, thereby minimizing the lateral footprint of the antenna module.

14 Claims, 10 Drawing Sheets

(56) References Cited

U.S. PATENT DOCUMENTS

| | | | | |
|---|---|---|---|---|
| 2019/0020121 | A1* | 1/2019 | Paulotto | H01Q 21/28 |
| 2020/0091608 | A1 | 3/2020 | Alpman et al. | |
| 2021/0257318 | A1* | 8/2021 | Han | H01Q 1/38 |
| 2022/0045442 | A1* | 2/2022 | Fabrega Sanchez | H01Q 5/42 |
| 2022/0328978 | A1* | 10/2022 | Sudo | H01Q 1/2283 |

* cited by examiner

RADIO-FREQUENCY MODULES HAVING HIGH-PERMITTIVITY ANTENNA LAYERS

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It may be desirable to support wireless communications in millimeter wave and centimeter wave communications bands. Millimeter wave communications, which are sometimes referred to as extremely high frequency (EHF) communications, and centimeter wave communications involve communications at frequencies of about 10-300 GHz. Operation at these frequencies can support high throughput but may raise significant challenges. For example, if care is not taken, the antennas might occupy excessive space within the electronic device or might exhibit insufficient radio-frequency performance.

It would therefore be desirable to be able to provide electronic devices with improved wireless communications circuitry such as communications circuitry that supports millimeter and centimeter wave communications.

SUMMARY

An electronic device may be provided with wireless circuitry. The wireless circuitry may include a phased antenna array formed on an antenna module. The phased antenna array may include low band antennas that radiate in a first frequency band greater than 10 GHz and high band antennas that radiate in a second frequency band higher than the first frequency band. The antenna module may include antenna layers, transmission line layers, and ground traces that separate the antenna layers from the transmission line layers.

The low band antennas and the high band antennas may have antenna resonating elements that are patterned onto the antenna layers. The antenna resonating elements may be fed by transmission lines on the transmission line layers. The antenna layers may have a dielectric permittivity that is greater than the dielectric permittivity of the transmission line layers. The antenna layers may, for example, have a dielectric permittivity that is greater than 6.0. This may serve to reduce the lateral footprint of the low band antennas and the high band antennas. This may allow the low band antennas and the high band antennas to be interleaved along a common linear axis in the phased antenna array, thereby minimizing the lateral footprint of the antenna module.

DETAILED DESCRIPTION

Figure 1:
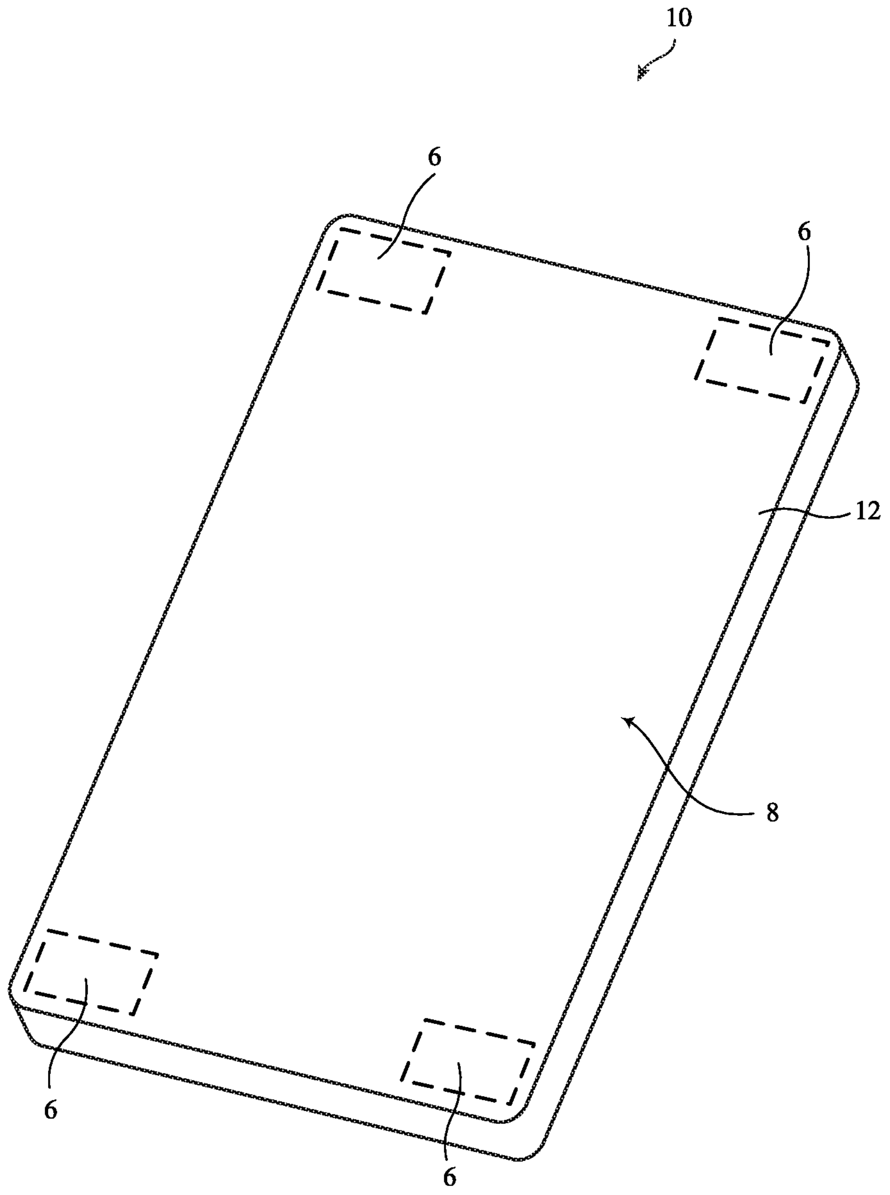
FIG. 1 is a front perspective view of an illustrative electronic device with wireless circuitry in accordance with some embodiments.

An electronic device such as electronic device 10 of FIG. 1 may contain wireless circuitry. The wireless circuitry may include one or more antennas. The antennas may include phased antenna arrays that are used for performing wireless communications and/or spatial ranging operations using millimeter and centimeter wave signals. Millimeter wave signals, which are sometimes referred to as extremely high frequency (EHF) signals, propagate at frequencies above about 30 GHz (e.g., at 60 GHz or other frequencies between about 30 GHz and 300 GHz). Centimeter wave signals propagate at frequencies between about 10 GHz and 30 GHz. If desired, device 10 may also contain antennas for handling satellite navigation system signals, cellular telephone signals, local wireless area network signals, near-field communications, light-based wireless communications, or other wireless communications.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless access point or base station, a desktop computer, a portable speaker, a keyboard, a gaming controller, a gaming system, a computer mouse, a mousepad, a trackpad or touchpad, equipment that implements the functionality of two or more of these devices, or other electronic equipment. In the illustrative configuration of FIG. 1, device 10 is a portable device such as a cellular telephone, media player, tablet computer, portable speaker, or other portable computing device. Other configurations may be used for device 10 if desired. The example of FIG. 1 is merely illustrative.

As shown in FIG. 1, device 10 may include a display such as display 8. Display 8 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 8 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch sensor electrodes may be formed from an array of indium tin oxide pads or other transparent conductive structures.

Display 8 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 8 may be protected using a display cover layer such as a layer of transparent glass, clear plastic, sapphire, or other transparent dielectrics. Openings may be formed in the display cover layer. For example, openings may be formed in the display cover layer to accommodate one or more buttons, sensor circuitry such as a fingerprint sensor or light sensor, ports such as a speaker port or microphone port, etc. Openings may be formed in housing 12 to form communications ports (e.g., an audio jack port, a digital data port, charging port, etc.). Openings in housing 12 may also be formed for audio components such as a speaker and/or a microphone.

Antennas may be mounted in housing 12. If desired, some of the antennas (e.g., antenna arrays that implement beam steering, etc.) may be mounted under an inactive border region of display 8 (see, e.g., illustrative antenna locations 6 of FIG. 1). Display 8 may contain an active area with an array of pixels (e.g., a central rectangular portion). Inactive areas of display 8 are free of pixels and may form borders for the active area. If desired, antennas may also operate through dielectric-filled openings in the rear of housing 12 or elsewhere in device 10.

To avoid disrupting communications when an external object such as a human hand or other body part of a user blocks one or more antennas, antennas may be mounted at multiple locations in housing 12. Sensor data such as proximity sensor data, real-time antenna impedance measurements, signal quality measurements such as received signal strength information, and other data may be used in determining when one or more antennas is being adversely affected due to the orientation of housing 12, blockage by a user's hand or other external object, or other environmental factors. Device 10 can then switch one or more replacement antennas into use in place of the antennas that are being adversely affected.

Antennas may be mounted at the corners of housing 12 (e.g., in corner locations 6 of FIG. 1 and/or in corner locations on the rear of housing 12), along the peripheral edges of housing 12, on the rear of housing 12, under the display cover glass or other dielectric display cover layer that is used in covering and protecting display 8 on the front of device 10, over a dielectric window on a rear face of housing 12 or the edge of housing 12, over a dielectric cover layer such as a dielectric rear housing wall that covers some or all of the rear face of device 10, or elsewhere in device 10.

Figure 2:
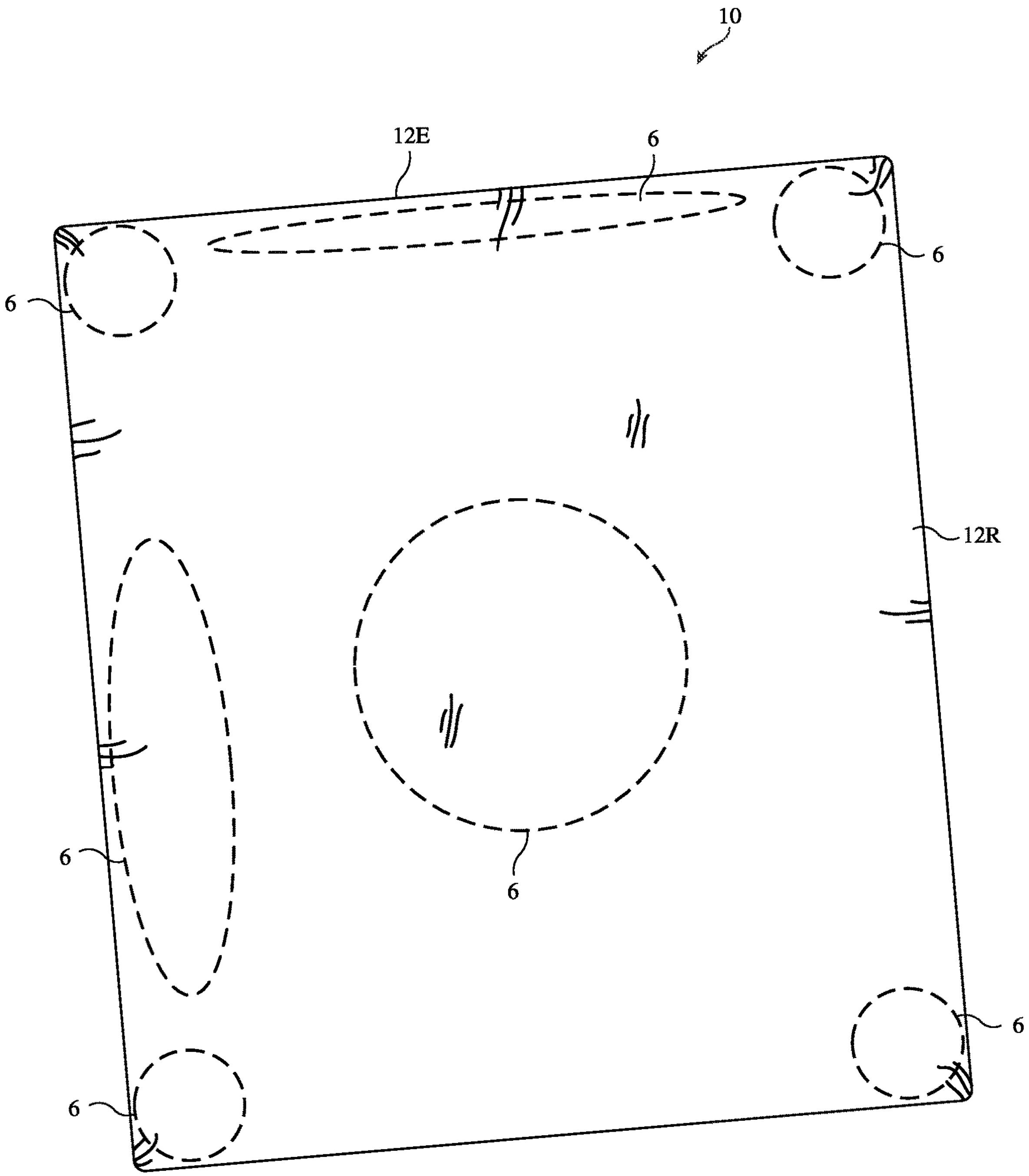
FIG. 2 is a rear perspective view of an illustrative electronic device with wireless circuitry in accordance with some embodiments.

FIG. 2 is a rear perspective view of electronic device 10 showing illustrative locations 6 on the rear and sides of housing 12 in which antennas (e.g., single antennas and/or phased antenna arrays) may be mounted in device 10. The antennas may be mounted at the corners of device 10, along the edges of housing 12 such as edges formed by sidewalls 12E, on upper and lower portions of rear housing wall 12R, in the center of rear housing wall 12R (e.g., under a dielectric window structure or other antenna window in the center of rear housing wall 12R), at the corners of rear housing wall 12R (e.g., on the upper left corner, upper right corner, lower left corner, and lower right corner of the rear of housing 12 and device 10), etc.

In configurations in which housing 12 is formed entirely or nearly entirely from a dielectric (e.g., plastic, glass, sapphire, ceramic, fabric, etc.), the antennas may transmit and receive antenna signals through any suitable portion of the dielectric. In configurations in which housing 12 is formed from a conductive material such as metal, regions of the housing such as slots or other openings in the metal may be filled with plastic or other dielectrics. The antennas may be mounted in alignment with the dielectric in the openings. These openings, which may sometimes be referred to as dielectric antenna windows, dielectric gaps, dielectric-filled openings, dielectric-filled slots, elongated dielectric opening regions, etc., may allow antenna signals to be transmitted to external wireless equipment from the antennas mounted within the interior of device 10 and may allow internal antennas to receive antenna signals from external wireless equipment. In another suitable arrangement, the antennas may be mounted on the exterior of conductive portions of housing 12.

FIGS. 1 and 2 are merely illustrative. In general, housing 12 may have any desired shape (e.g., a rectangular shape, a cylindrical shape, a spherical shape, combinations of these, the shape of a wearable or head-mounted device such as goggles, a helmet, or glasses, the shape of a peripheral electronic device such as a gaming controller or remote control, etc.). Display 8 of FIG. 1 may be omitted if desired. Antennas may be located within housing 12, on housing 12, and/or external to housing 12.

Figure 3:
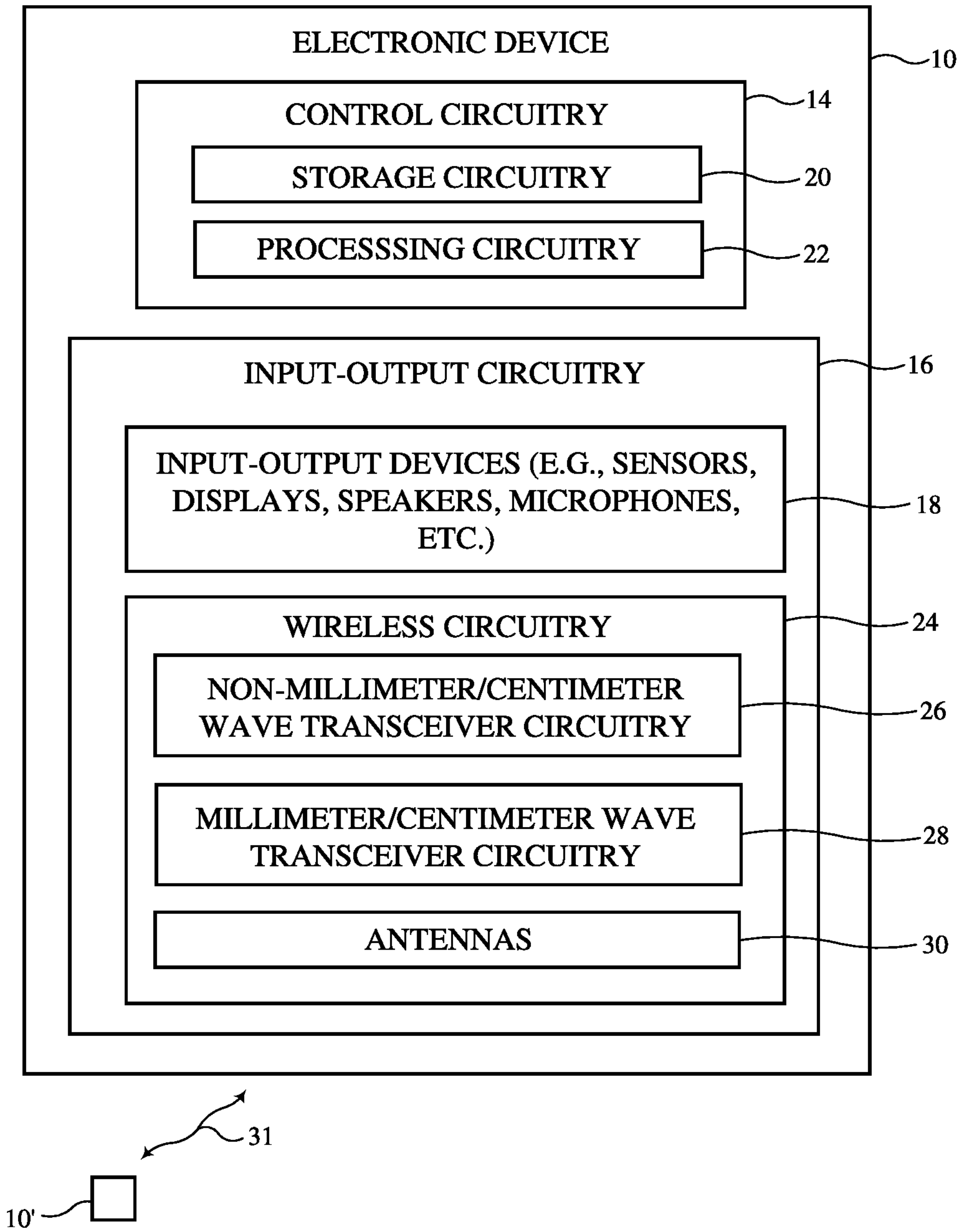
FIG. 3 is a schematic diagram of an illustrative electronic device with wireless circuitry in accordance with some embodiments.

A schematic diagram of illustrative components that may be used in device 10 is shown in FIG. 3. As shown in FIG. 3, device 10 may include control circuitry 14. Control circuitry 14 may include storage such as storage circuitry 20. Storage circuitry 20 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 14 may include processing circuitry such as processing circuitry 22. Processing circuitry 22 may be used to control the operation of device 10. Processing circuitry 22 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 20 (e.g., storage circuitry 20 may include non-transitory (tangible) computer readable storage media that stores the software code). The software code may sometimes be referred to as program instructions, software, data, instructions, or code. Software code stored on storage circuitry 20 may be executed by processing circuitry 22.

Control circuitry 14 may be used to run software on device 10 such as internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 16. Input-output circuitry 16 may include input-output devices 18. Input-output devices 18 may be used to allow data to be supplied to device 10 and to allow data to be provided from device 10 to external devices. Input-output devices 18 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 16 may include wireless circuitry such as wireless circuitry 24 for wirelessly conveying radio-frequency signals. While control circuitry 14 is shown separately from wireless circuitry 24 in the example of FIG. 3 for the sake of clarity, wireless circuitry 24 may include processing circuitry that forms a part of processing circuitry 22 and/or storage circuitry that forms a part of storage circuitry 20 of control circuitry 14 (e.g., portions of control circuitry 14 may be implemented on wireless circuitry 24). As an example, control circuitry 14 may include baseband processor circuitry or other control components that form a part of wireless circuitry 24.

Wireless circuitry 24 may include millimeter and centimeter wave transceiver circuitry such as millimeter/centimeter wave transceiver circuitry 28. Millimeter/centimeter wave transceiver circuitry 28 may support communications at frequencies between about 10 GHz and 300 GHz. For example, millimeter/centimeter wave transceiver circuitry 28 may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, millimeter/centimeter wave transceiver circuitry 28 may support communications in an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, millimeter/centimeter wave transceiver circuitry 28 may support IEEE 802.11ad communications at 60 GHz and/or $5^{th}$ generation mobile networks or $5^{th}$ generation wireless systems (5G) New Radio (NR) Frequency Range 2 (FR2) communications bands between about 24 GHz and 90 GHz (e.g., FR2 bands N257, N258, and/or N261 between about 24.25 GHz and 29.5 GHz, FR2 bands N259 and/or N260 between about 37 GHz and 43.5 GHz, etc.). Millimeter/centimeter wave transceiver circuitry 28 may be formed from one or more integrated circuits (e.g., multiple integrated circuits mounted on a common printed circuit in a system-in-package device, one or more integrated circuits mounted on different substrates, etc.).

Millimeter/centimeter wave transceiver circuitry 28 (sometimes referred to herein simply as transceiver circuitry 28 or millimeter/centimeter wave circuitry 28) may perform spatial ranging operations using radio-frequency signals at millimeter and/or centimeter wave frequencies that are transmitted and received by millimeter/centimeter wave transceiver circuitry 28. The received signals may be a version of the transmitted signals that have been reflected off of external objects and back towards device 10. Control circuitry 14 may process the transmitted and received signals to detect or estimate a range between device 10 and one or more external objects in the surroundings of device 10 (e.g., objects external to device 10 such as the body of a user or other persons, other devices, animals, furniture, walls, or other objects or obstacles in the vicinity of device 10). If desired, control circuitry 14 may also process the transmitted and received signals to identify a two or three-dimensional spatial location of the external objects relative to device 10.

Spatial ranging operations performed by millimeter/centimeter wave transceiver circuitry 28 are unidirectional. If desired, millimeter/centimeter wave transceiver circuitry 28 may also perform bidirectional communications with external wireless equipment such as external wireless equipment 10' (e.g., over bi-directional millimeter/centimeter wave wireless communications link 31). External wireless equipment 10' may include other electronic devices such as electronic device 10, a wireless base station, wireless access point, a wireless accessory, or any other desired equipment that transmits and receives millimeter/centimeter wave signals. Bidirectional communications involve both the transmission of wireless data by millimeter/centimeter wave transceiver circuitry 28 and the reception of wireless data that has been transmitted by external wireless equipment 10'. The wireless data may, for example, include data that has been encoded into corresponding data packets such as wireless data associated with a telephone call, streaming media content, internet browsing, wireless data associated with software applications running on device 10, email messages, etc.

If desired, wireless circuitry 24 may include transceiver circuitry for handling communications at frequencies below 10 GHz such as non-millimeter/centimeter wave transceiver circuitry 26. For example, non-millimeter/centimeter wave transceiver circuitry 26 may handle wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz (e.g., 3G bands, 4G LTE bands, 5G New Radio Frequency Range 1 (FR1) bands below 10 GHz, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHz and/or a second UWB communications band at 8.0 GHz), and/or any other desired communications bands. The communications bands handled by the radio-frequency transceiver circuitry may sometimes be referred to herein as frequency bands or simply as "bands," and may span corresponding ranges of frequencies. Non-millimeter/centimeter wave transceiver circuitry 26 and millimeter/centimeter wave transceiver circuitry 28 may each include one or more integrated circuits, power amplifier circuitry, low-noise input amplifiers, passive radio-frequency components, switching circuitry, transmission line structures, and other circuitry for handling radio-frequency signals.

In general, the transceiver circuitry in wireless circuitry 24 may cover (handle) any desired frequency bands of interest. As shown in FIG. 3, wireless circuitry 24 may include antennas 30. The transceiver circuitry may convey radio-frequency signals using one or more antennas 30 (e.g., antennas 30 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 30 may transmit the radio-frequency signals by radiating the radio-frequency signals into free space (or to freespace through intervening device structures such as a dielectric cover layer). Antennas 30 may additionally or alternatively receive the radio-frequency signals from free space (e.g., through intervening devices structures such as a dielectric cover layer). The transmission and reception of radio-frequency signals by antennas 30 each involve the excitation or resonance of antenna currents on an antenna resonating element in the antenna by the radio-frequency signals within the frequency band(s) of operation of the antenna.

In satellite navigation system links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. Millimeter/centimeter wave transceiver circuitry 28 may convey radio-frequency signals over short distances that travel over a line-of-sight path. To enhance signal reception for millimeter and centimeter wave communications, phased antenna arrays and beam forming (steering) techniques may be used (e.g., schemes in which antenna signal phase and/or magnitude for each antenna in an array are adjusted to perform beam steering). Antenna diversity schemes may also be used to ensure that the antennas that have become blocked or that are otherwise degraded due to the operating environment of device 10 can be switched out of use and higher-performing antennas used in their place.

Antennas 30 in wireless circuitry 24 may be formed using any suitable antenna types. For example, antennas 30 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, hybrids of these designs, etc. If desired, one or more of antennas 30 may be cavity-backed antennas. Different types of antennas may be used for different bands and combinations of bands. For example, one type of antenna may be used in forming a non-millimeter/centimeter wave wireless link for non-millimeter/centimeter wave transceiver circuitry 26 and another type of antenna may be used in conveying radio-frequency signals at millimeter and/or centimeter wave frequencies for millimeter/centimeter wave transceiver circuitry 28. Antennas 30 that are used to convey radio-frequency signals at millimeter and centimeter wave frequencies may be arranged in one or more phased antenna arrays. In one suitable arrangement that is described herein as an example, the antennas 30 that are arranged in a corresponding phased antenna array may be stacked patch antennas having patch antenna resonating elements that overlap and are vertically stacked with respect to one or more parasitic patch elements.

Figure 4:
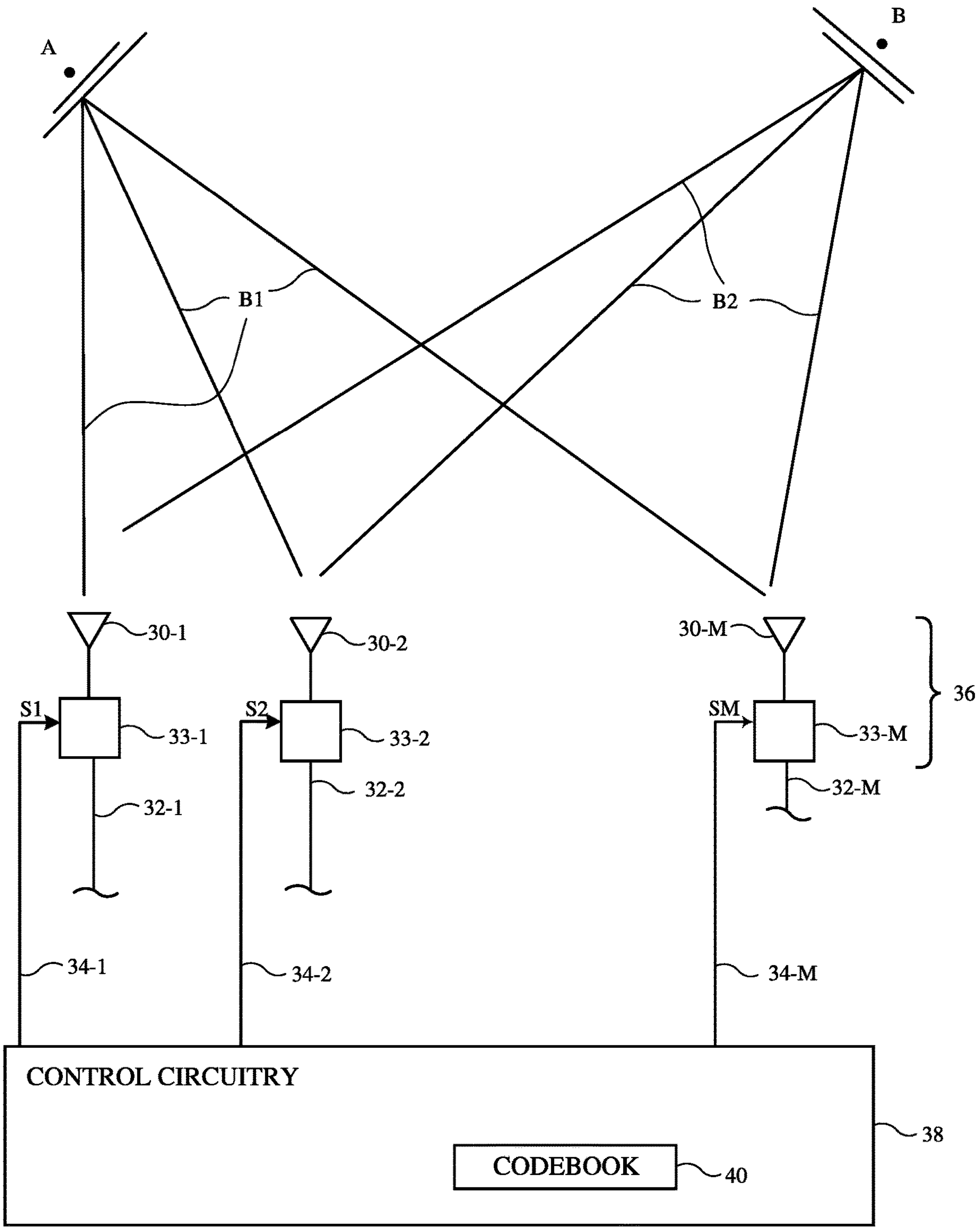
FIG. 4 is a diagram of an illustrative phased antenna array in accordance with some embodiments.

FIG. 4 is a diagram showing how antennas 30 for handling radio-frequency signals at millimeter and centimeter wave frequencies may be formed in a phased antenna array. As shown in FIG. 4, phased antenna array 36 (sometimes referred to herein as array 36, antenna array 36, or array 36 of antennas 30) may be coupled to radio-frequency transmission line paths 32. For example, a first antenna 30-1 in phased antenna array 36 may be coupled to a first radio-frequency transmission line path 32-1, a second antenna 30-2 in phased antenna array 36 may be coupled to a second radio-frequency transmission line path 32-2, an Mth antenna 30-M in phased antenna array 36 may be coupled to an Mth radio-frequency transmission line path 32-M, etc. While antennas 30 are described herein as forming a phased antenna array, the antennas 30 in phased antenna array 36 may sometimes also be referred to as collectively forming a single phased array antenna (e.g., where each antenna 30 in the phased array antenna forms an antenna element of the phased array antenna).

Radio-frequency transmission line paths 32 may each be coupled to millimeter/centimeter wave transceiver circuitry 28 of FIG. 3. Each radio-frequency transmission line path 32 may include one or more radio-frequency transmission lines, a positive signal conductor, and a ground signal conductor. The positive signal conductor may be coupled to a positive antenna feed terminal on an antenna resonating element of the corresponding antenna 30. The ground signal conductor may be coupled to a ground antenna feed terminal on an antenna ground for the corresponding antenna 30.

Radio-frequency transmission line paths 32 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, conductive vias, combinations of these, etc. Multiple types of transmission lines may be used to couple the millimeter/centimeter wave transceiver circuitry to phased antenna array 36. Filter circuitry, switching circuitry, impedance matching circuitry, phase shifter circuitry, amplifier circuitry, and/or other circuitry may be interposed on radio-frequency transmission line path 32, if desired.

Radio-frequency transmission lines in device 10 may be integrated into ceramic substrates, rigid printed circuit boards, and/or flexible printed circuits. In one suitable arrangement, radio-frequency transmission lines in device 10 may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Antennas 30 in phased antenna array 36 may be arranged in any desired number of rows and columns or in any other desired pattern (e.g., the antennas need not be arranged in a grid pattern having rows and columns). During signal transmission operations, radio-frequency transmission line paths 32 may be used to supply signals (e.g., radio-frequency signals such as millimeter wave and/or centimeter wave signals) from millimeter/centimeter wave transceiver circuitry 28 (FIG. 3) to phased antenna array 36 for wireless transmission. During signal reception operations, radio-frequency transmission line paths 32 may be used to convey signals received at phased antenna array 36 (e.g., from external wireless equipment 10' of FIG. 3) to millimeter/centimeter wave transceiver circuitry 28 (FIG. 3).

The use of multiple antennas 30 in phased antenna array 36 allows radio-frequency beam forming arrangements (sometimes referred to herein as radio-frequency beam steering arrangements) to be implemented by controlling the relative phases and magnitudes (amplitudes) of the radio-frequency signals conveyed by the antennas. In the example of FIG. 4, the antennas 30 in phased antenna array 36 each have a corresponding radio-frequency phase and magnitude controller 33 (e.g., a first phase and magnitude controller 33-1 interposed on radio-frequency transmission line path 32-1 may control phase and magnitude for radio-frequency signals handled by antenna 30-1, a second phase and magnitude controller 33-2 interposed on radio-frequency transmission line path 32-2 may control phase and magnitude for radio-frequency signals handled by antenna 30-2, an Mth phase and magnitude controller 33-M interposed on radio-frequency transmission line path 32-M may control phase and magnitude for radio-frequency signals handled by antenna 30-M, etc.).

Phase and magnitude controllers 33 may each include circuitry for adjusting the phase of the radio-frequency signals on radio-frequency transmission line paths 32 (e.g., phase shifter circuits) and/or circuitry for adjusting the magnitude of the radio-frequency signals on radio-frequency transmission line paths 32 (e.g., power amplifier and/or low noise amplifier circuits). Phase and magnitude controllers 33 may sometimes be referred to collectively herein as beam steering or beam forming circuitry (e.g., beam steering circuitry that steers the beam of radio-frequency signals transmitted and/or received by phased antenna array 36).

Phase and magnitude controllers 33 may adjust the relative phases and/or magnitudes of the transmitted signals that are provided to each of the antennas in phased antenna array 36 and may adjust the relative phases and/or magnitudes of the received signals that are received by phased antenna array 36. Phase and magnitude controllers 33 may, if desired, include phase detection circuitry for detecting the phases of the received signals that are received by phased antenna array 36. The term "beam," "signal beam," "radio-frequency beam," or "radio-frequency signal beam" may be used herein to collectively refer to wireless signals that are transmitted and received by phased antenna array 36 in a particular direction. The signal beam may exhibit a peak gain that is oriented in a particular beam pointing direction at a corresponding beam pointing angle (e.g., based on constructive and destructive interference from the combination of signals from each antenna in the phased antenna array). The term "transmit beam" may sometimes be used herein to refer to radio-frequency signals that are transmitted in a particular direction whereas the term "receive beam" may sometimes be used herein to refer to radio-frequency signals that are received from a particular direction.

If, for example, phase and magnitude controllers 33 are adjusted to produce a first set of phases and/or magnitudes for transmitted radio-frequency signals, the transmitted signals will form a transmit beam as shown by beam B1 of FIG. 4 that is oriented in the direction of point A. If, however, phase and magnitude controllers 33 are adjusted to produce a second set of phases and/or magnitudes for the transmitted signals, the transmitted signals will form a transmit beam as shown by beam B2 that is oriented in the direction of point B. Similarly, if phase and magnitude controllers 33 are adjusted to produce the first set of phases and/or magnitudes, radio-frequency signals (e.g., radio-frequency signals in a receive beam) may be received from the direction of point A, as shown by beam B1. If phase and magnitude controllers 33 are adjusted to produce the second set of phases and/or magnitudes, radio-frequency signals may be received from the direction of point B, as shown by beam B2.

Each phase and magnitude controller 33 may be controlled to produce a desired phase and/or magnitude based on a corresponding control signal S received from control circuitry 38 of FIG. 4 over control paths 34 (e.g., the phase and/or magnitude provided by phase and magnitude controller 33-1 may be controlled using control signal S1 on control path 34-1, the phase and/or magnitude provided by phase and magnitude controller 33-2 may be controlled using control signal S2 on control path 34-2, the phase and/or magnitude provided by phase and magnitude controller 33-M may be controlled using control signal SM on control path 34-M, etc.). If desired, control circuitry 38 may actively adjust control signals S in real time to steer the transmit or receive beam in different desired directions (e.g., to different desired beam pointing angles) over time. Phase and magnitude controllers 33 may provide information identifying the phase of received signals to control circuitry 38 if desired.

When performing wireless communications using radio-frequency signals at millimeter and centimeter wave frequencies, the radio-frequency signals are conveyed over a line of sight path between phased antenna array 36 and external wireless equipment (e.g., external wireless equipment 10' of FIG. 3). If the external wireless equipment is located at point A of FIG. 4, phase and magnitude controllers 33 may be adjusted to steer the signal beam towards point A (e.g., to form a signal beam having a beam pointing angle directed towards point A). Phased antenna array 36 may then transmit and receive radio-frequency signals in the direction of point A. Similarly, if the external wireless equipment is located at point B, phase and magnitude controllers 33 may be adjusted to steer the signal beam towards point B (e.g., to form a signal beam having a beam pointing angle directed towards point B). Phased antenna array 36 may then transmit and receive radio-frequency signals in the direction of point B. In the example of FIG. 4, beam steering is shown as being performed over a single degree of freedom for the sake of simplicity (e.g., towards the left and right on the page of FIG. 4). However, in practice, the beam may be steered over two or more degrees of freedom (e.g., in three dimensions, into and out of the page and to the left and right on the page of FIG. 4). Phased antenna array 36 may have a corresponding field of view over which beam steering can be performed (e.g., in a hemisphere or a segment of a hemisphere over the phased antenna array). If desired, device 10 may include multiple phased antenna arrays that each face a different direction to provide coverage from multiple sides of the device.

Control circuitry 38 of FIG. 4 may form a part of control circuitry 14 of FIG. 3 or may be separate from control circuitry 14 of FIG. 3. Control circuitry 38 of FIG. 4 may identify a desired beam pointing angle for the signal beam of phased antenna array 36 and may adjust the control signals S provided to phased antenna array 36 to configure phased antenna array 36 to form (steer) the signal beam at that beam pointing angle. Each possible beam pointing angle that can be used by phased antenna array 36 during wireless communications may be identified by a beam steering codebook such as codebook 40. Codebook 40 may be stored at control circuitry 38, elsewhere on device 10, or may be located (offloaded) on external equipment and conveyed to device 10 over a wired or wireless communications link.

Codebook 40 may identify each possible beam pointing angle that may be used by phased antenna array 36. Control circuitry 38 may store or identify phase and magnitude settings for phase and magnitude controllers 33 to use in implementing each of those beam pointing angles (e.g., control circuitry 38 or codebook 40 may include information that maps each beam pointing angle for phased antenna array 36 to a corresponding set of phase and magnitude values for phase and magnitude controllers 33). Codebook 40 may be hard-coded or soft-coded into control circuitry 38 or elsewhere in device 10, may include one or more databases stored at control circuitry 38 or elsewhere in device 10 (e.g., codebook 40 may be stored as software code), may include one or more look-up-tables at control circuitry 38 or elsewhere in device 10, and/or may include any other desired data structures stored in hardware and/or software on device 10. Codebook 40 may be generated during calibration of device 10 (e.g., during design, manufacturing, and/or testing of device 10 prior to device 10 being received by an end user) and/or may be dynamically updated over time (e.g., after device 10 has been used by an end user).

Control circuitry 38 may generate control signals S based on codebook 40. For example, control circuitry 38 may identify a beam pointing angle that would be needed to communicate with external wireless equipment 10' of FIG. 3 (e.g., a beam pointing angle pointing towards external wireless equipment 10'). Control circuitry 38 may subsequently identify the beam pointing angle in codebook 40 that is closest to this identified beam pointing angle. Control circuitry 38 may use codebook 40 to generate phase and magnitude values for phase and magnitude controllers 33. Control circuitry 38 may transmit control signals S identifying these phase and magnitude values to phase and magnitude controllers 33 over control paths 34. The beam formed by phased antenna array 36 using control signals S will be oriented at the beam pointing angle identified by codebook 40. If desired, control circuitry 38 may sweep over some or all of the different beam pointing angles identified by codebook 40 until the external wireless equipment is found and may use the corresponding beam pointing angle at which the external wireless equipment was found to communicate with the external wireless equipment (e.g., over communications link 31 of FIG. 3).

Figure 5:
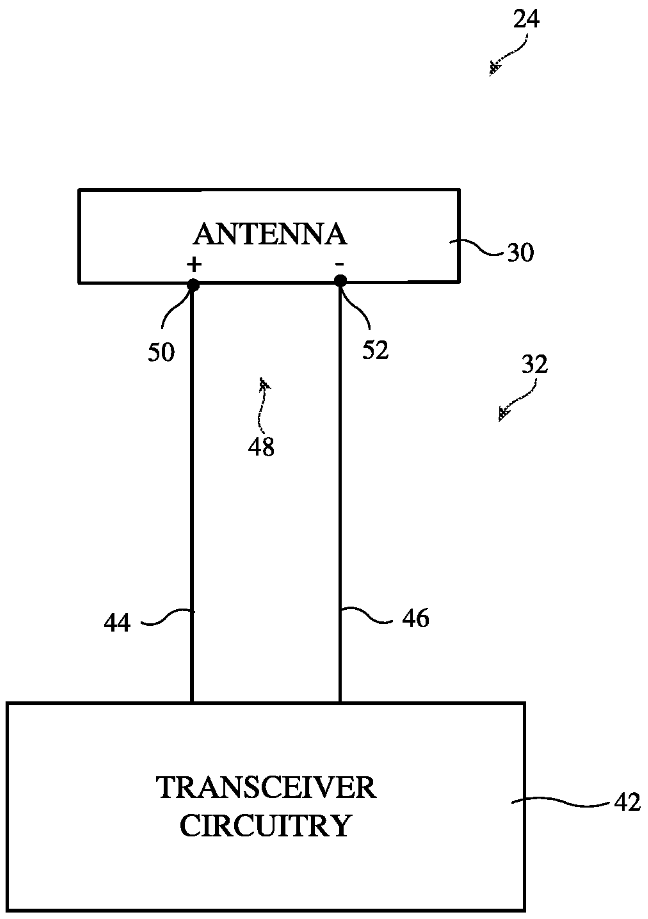
FIG. 5 is a diagram of illustrative wireless circuitry in accordance with some embodiments.

A schematic diagram of an antenna 30 that may be formed in phased antenna array 36 (e.g., as antenna 30-1, 30-2, 30-3, and/or 30-N in phased antenna array 36 of FIG. 4) is shown in FIG. 5. As shown in FIG. 5, antenna 30 may be coupled to transceiver circuitry 42 (e.g., millimeter wave transceiver circuitry 28 of FIG. 3). Transceiver circuitry 42 may be coupled to antenna feed 48 of antenna 30 using radio-frequency transmission line path 32. Antenna feed 48 may include a positive antenna feed terminal such as positive antenna feed terminal 50 and may include a ground antenna feed terminal such as ground antenna feed terminal 52. Radio-frequency transmission line path 32 may include a positive signal conductor such as signal conductor 44 that is coupled to positive antenna feed terminal 50 and a ground conductor such as ground conductor 46 that is coupled to ground antenna feed terminal 52.

Figure 6:
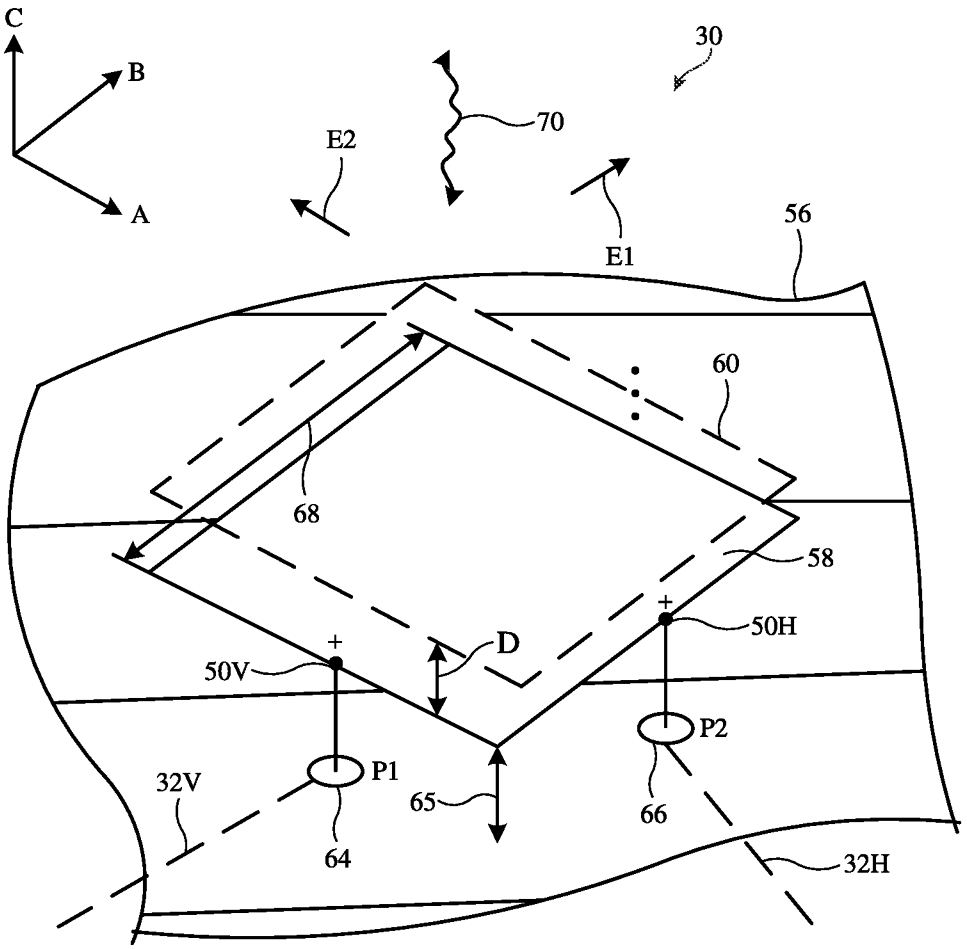
FIG. 6 is a perspective view of an illustrative antenna having one or more patch elements in accordance with some embodiments.

Any desired antenna structures may be used to form antenna 30. In one suitable arrangement that is sometimes described herein as an example, stacked patch antenna structures may be used to form antenna 30. Antennas 30 that are formed using stacked patch antenna structures may sometimes be referred to herein as stacked patch antennas or simply as patch antennas. FIG. 6 is a perspective view of an illustrative patch antenna that may be used in phased antenna array 36.

As shown in FIG. 6, antenna 30 may have a patch antenna resonating element 58 that is separated from and parallel to a ground plane such as antenna ground 56. Patch antenna resonating element 58 may lie within a plane such as the A-B plane of FIG. 6 (e.g., the lateral surface area of element 58 may lie in the A-B plane). Patch antenna resonating element 58 may sometimes be referred to herein as patch 58, patch element 58, patch resonating element 58, antenna resonating element 58, or resonating element 58. Antenna ground 56 may lie within a plane that is parallel to the plane of patch element 58. Patch element 58 and antenna ground 56 may therefore lie in separate parallel planes that are separated by distance 65. Patch element 58 and antenna ground 56 may be formed from conductive traces patterned on a dielectric substrate such as a rigid or flexible printed circuit board substrate or any other desired conductive structures.

The length of the sides of patch element 58 may be selected so that antenna 30 resonates at a desired operating frequency. For example, the sides of patch element 58 may each have a length 68 that is approximately equal to half of the wavelength of the signals conveyed by antenna 30 (e.g., the effective wavelength given the dielectric properties of the materials surrounding patch element 58). In one suitable arrangement, length 68 may be between 0.8 mm and 1.2 mm (e.g., approximately 1.1 mm) for covering a millimeter wave frequency band between 57 GHz and 70 GHz or between 1.6 mm and 2.2 mm (e.g., approximately 1.85 mm) for covering a millimeter wave frequency band between 37 GHz and 41 GHz, as just two examples.

The example of FIG. 6 is merely illustrative. Patch element 58 may have a square shape in which all of the sides of patch element 58 are the same length or may have a different rectangular shape. Patch element 58 may be formed in other shapes having any desired number of straight and/or curved edges.

To enhance the polarizations handled by antenna 30, antenna 30 may be provided with multiple feeds. As shown in FIG. 6, antenna 30 may have a first feed at antenna port P1 that is coupled to a first radio-frequency transmission line path 32 such as radio-frequency transmission line path 32V. Antenna 30 may have a second feed at antenna port P2 that is coupled to a second radio-frequency transmission line path 32 such as radio-frequency transmission line path 32H. The first antenna feed may have a first ground feed terminal coupled to antenna ground 56 (not shown in FIG. 6 for the sake of clarity) and a first positive antenna feed terminal 50V coupled to patch element 58. The second antenna feed may have a second ground feed terminal coupled to antenna ground 56 (not shown in FIG. 6 for the sake of clarity) and a second positive antenna feed terminal 50H on patch element 58.

Holes or openings such as openings 64 and 66 may be formed in antenna ground 56. Radio-frequency transmission line path 32V may include a vertical conductor (e.g., a conductive through-via, conductive pin, metal pillar, solder bump, combinations of these, and/or other vertical conductive interconnect structures) that extends through opening 64 to positive antenna feed terminal 50V on patch element 58. Radio-frequency transmission line path 32H may include a vertical conductor that extends through opening 66 to positive antenna feed terminal 50H on patch element 58. This example is merely illustrative and, if desired, other transmission line structures may be used (e.g., coaxial cable structures, stripline transmission line structures, etc.).

When using the first antenna feed associated with port P1, antenna 30 may transmit and/or receive radio-frequency signals having a first polarization (e.g., the electric field E1 of radio-frequency signals 70 associated with port P1 may be oriented parallel to the B-axis in FIG. 5). When using the antenna feed associated with port P2, antenna 30 may transmit and/or receive radio-frequency signals having a second polarization (e.g., the electric field E2 of radio-frequency signals 70 associated with port P2 may be oriented parallel to the A-axis of FIG. 5 so that the polarizations associated with ports P1 and P2 are orthogonal to each other).

One of ports P1 and P2 may be used at a given time so that antenna 30 operates as a single-polarization antenna or both ports may be operated at the same time so that antenna 30 operates with other polarizations (e.g., as a dual-polarization antenna, a circularly-polarized antenna, an elliptically-polarized antenna, etc.). If desired, the active port may be changed over time so that antenna 30 can switch between covering vertical or horizontal polarizations at a given time. Ports P1 and P2 may be coupled to different phase and magnitude controllers 33 (FIG. 3) or may both be coupled to the same phase and magnitude controller 33. If desired, ports P1 and P2 may both be operated with the same phase and magnitude at a given time (e.g., when antenna 30 acts as a dual-polarization antenna). If desired, the phases and magnitudes of radio-frequency signals conveyed over ports P1 and P2 may be controlled separately and varied over time so that antenna 30 exhibits other polarizations (e.g., circular or elliptical polarizations).

If care is not taken, antennas 30 such as dual-polarization patch antennas of the type shown in FIG. 6 may have insufficient bandwidth for covering relatively wide ranges of frequencies. It may be desirable for antenna 30 to be able to cover both a first frequency band and a second frequency band at frequencies higher than the first frequency band. In one suitable arrangement that is described herein as an example, the first frequency band may include frequencies from about 24-30 GHz whereas the second frequency band includes frequencies from about 37-40 GHz. In these scenarios, patch element 58 may not exhibit sufficient bandwidth on its own to cover an entirety of both the first and second frequency bands.

If desired, antenna 30 may include one or more additional patch elements 60 that are stacked over patch element 58. Each patch element 60 may partially or completely overlap patch element 58. The lower-most patch element 60 may be separated from patch element 58 by distance D, which is selected to provide antenna 30 with a desired bandwidth without occupying excessive volume within device 10. Patch elements 60 may have sides with lengths other than length 68, which configure patch elements 60 to radiate at different frequencies than patch element 58, thereby extending the overall bandwidth of antenna 30.

Patch elements 60 may include directly-fed patch antenna resonating elements (e.g., patch elements with one or more positive antenna feed terminals directly coupled to transmission lines) and/or parasitic antenna resonating elements that are not directly fed by antenna feed terminals and transmission lines. One or more patch elements 60 may be coupled to patch element 58 by one or more conductive through vias if desired (e.g., so that at least one patch element 60 and patch element 58 are coupled together as a single directly fed resonating element). In scenarios where patch elements 60 are directly fed, patch elements 60 may include two positive antenna feed terminals for conveying signals with different (e.g., orthogonal) polarizations and/or may include a single positive antenna feed terminal for conveying signals with a single polarization. The combined resonance of patch element 58 and each of patch elements 60 may configure antenna 30 to radiate with satisfactory antenna efficiency across an entirety of both the first and second frequency bands (e.g., from 24-30 GHz and from 37-40 GHz). The example of FIG. 5 is merely illustrative. Patch elements 60 may be omitted if desired. Patch elements 60 may be rectangular, square, cross-shaped, or any other desired shape having any desired number of straight and/or curved edges. Patch element 60 may be provided at any desired orientation relative to patch element 58. Antenna 30 may have any desired number of feeds. Other antenna types may be used if desired (e.g., dipole antennas, monopole antennas, slot antennas, etc.).

Figure 7:
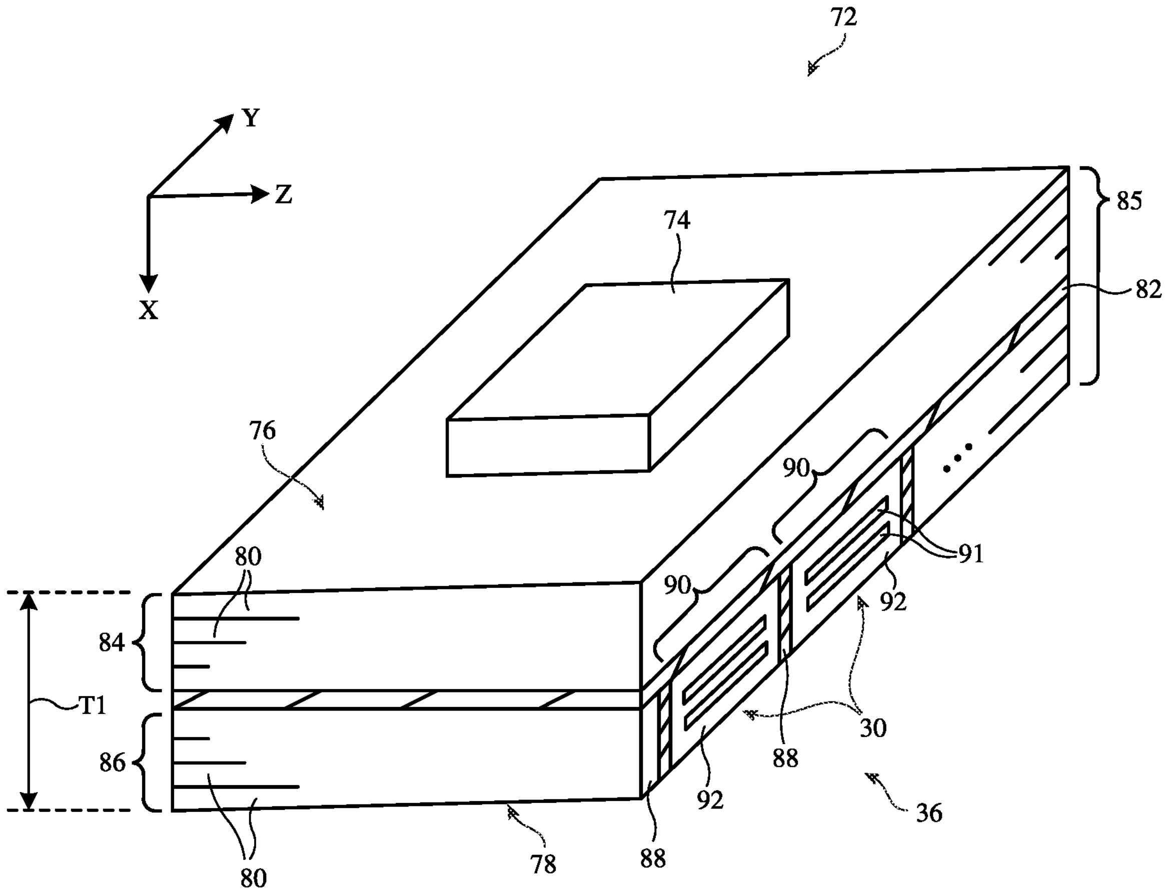
FIG. 7 is a perspective view of an illustrative antenna module in accordance with some embodiments.

If desired, phased antenna array 36 may be integrated with other circuitry such as a radio-frequency integrated circuit to form an integrated antenna module. FIG. 7 is a rear perspective view of an illustrative integrated antenna module for handling signals at frequencies greater than 10 GHz in device 10. As shown in FIG. 7, device 10 may be provided with an integrated antenna module such as integrated antenna module 72 (sometimes referred to herein as antenna module 72 or module 72).

Antenna module 72 may include phased antenna array 36 of antennas 30 formed on a dielectric substrate such as substrate 85. Substrate 85 may be, for example, a rigid printed circuit board. Substrate 85 may be a stacked dielectric substrate that includes multiple stacked dielectric layers 80 (e.g., multiple layers of printed circuit board substrate such as multiple layers of fiberglass-filled epoxy, rigid printed circuit board material, ceramic, plastic, glass, or other dielectrics). Phased antenna array 36 may include any desired number of antennas 30 arranged in any desired pattern.

Antennas 30 in phased antenna array 36 may include antenna elements such as patch elements 91 (e.g., patch elements 91 may form patch element 58 and/or one or more patch elements 60 of FIG. 6). Ground traces 82 may be patterned onto substrate 85 (e.g., conductive traces forming antenna ground 56 of FIG. 6 for each of the antennas 30 in phased antenna array 36). Patch elements 91 may be patterned on (bottom) surface 78 of substrate 85 or may be embedded within dielectric layers 80 at or adjacent to surface 78. Only two patch elements 91 are shown in FIG. 7 for the sake of clarity. This is merely illustrative and, in general, antennas 30 may include any desired number of one or more patch elements 91.

One or more electrical components 74 may be mounted on (top) surface 76 of substrate 85 (e.g., the surface of substrate 85 opposite surface 78 and patch elements 91). Component 74 may, for example, include an integrated circuit (e.g., an integrated circuit chip) or other circuitry mounted to surface 76 of substrate 85. Component 74 may include radio-frequency components such as amplifier circuitry, phase shifter circuitry (e.g., phase and magnitude controllers 33 of FIG. 4), and/or other circuitry that operates on radio-frequency signals. Component 74 may sometimes be referred to herein as radio-frequency integrated circuit (RFIC) 74. However, this is merely illustrative and, in general, the circuitry of RFIC 74 need not be formed on an integrated circuit. Component 74 may be embedded within a plastic overmold if desired.

The dielectric layers 80 in substrate 85 may include a first set of layers 86 (sometimes referred to herein as antenna layers 86) and a second set of layers 84 (sometimes referred to herein as transmission line layers 84). Ground traces 82 may separate antenna layers 86 from transmission line layers 84. Conductive traces or other metal layers on transmission line layers 84 may be used in forming transmission line structures such as radio-frequency transmission line paths 32 of FIG. 5 (e.g., radio-frequency transmission line paths 32V and 32H of FIG. 6). For example, conductive traces on transmission line layers 84 may be used in forming stripline or microstrip transmission lines that are coupled between the antenna feeds for antennas 30 (e.g., over conductive vias extending through antenna layers 86) and RFIC 74 (e.g., over conductive vias extending through transmission line layers 84). A board-to-board connector (not shown) may couple RFIC 74 to the baseband and/or transceiver circuitry for phased antenna array 36 (e.g., millimeter/centimeter wave transceiver circuitry 28 of FIG. 3).

If desired, each antenna 30 in phased antenna array 36 may be laterally surrounded by fences of conductive vias 88 (e.g., conductive vias extending parallel to the X-axis and through antenna layers 86 of FIG. 7). The fences of conductive vias 88 for phased antenna array 36 may be shorted to ground traces 82 so that the fences of conductive vias 88 are held at a ground potential. Conductive vias 88 may extend downwards to surface 78 or to the same dielectric layer 80 as the bottom-most patch element 91 in phased antenna array 36. The patch elements 91 in each antenna 30 may be patterned onto respective dielectric layers 80 of antenna layers 86.

The fences of conductive vias 88 may be opaque at the frequencies covered by antennas 30. Each antenna 30 may lie within a respective antenna cavity 92 having conductive cavity walls defined by a corresponding set of fences of conductive vias 88 in antenna layers 86. The fences of conductive vias 88 may help to ensure that each antenna 30 in phased antenna array 36 is suitably isolated, for example. Phased antenna array 36 may include a number of antenna unit cells 90. Each antenna unit cell 90 may include respective fences of conductive vias 88, a respective antenna cavity 92 defined by (e.g., laterally surrounded by) those fences of conductive vias, and a respective antenna 30 (e.g., set of patch elements 91) within that antenna cavity 92. Conductive vias 88 may be omitted if desired. Substrate 85 in antenna module 72 may have thickness T1.

It may be desirable for phased antenna array 36 to cover/handle multiple frequency bands. For example, phased antenna array 36 may cover a low band (LB) (e.g., at frequencies between about 24.25 GHz and 29.5 GHz to cover at least FR2 bands N257, N258, and N261 and/or other bands) and a high band (HB) at higher frequencies than the low band (e.g., at frequencies between about 36 GHz and 43.5 GHz to cover at least FR2 bands N259, N260, and/or other bands). In some scenarios, each antenna 30 in phased antenna array 36 includes a respective first patch element 91 that radiates in the low band and respective second patch element 91 that radiates in the high band and that is stacked over (e.g., overlapping) the first patch element. While stacked patch arrangements such as these may minimize the lateral footprint of each antenna 30 (e.g., in the Z-Y plane of FIG. 7), these arrangements may also lead to excessive thicknesses T1 for antenna module 72.

In other scenarios, phased antenna array 36 includes a first set of antennas 30 that radiate in the low band and a second set of antennas 30 that radiate in the high band. However, if care is not taken, the footprint of the antennas in this example may be relatively large, causing the first and second sets of antennas to need to be distributed across multiple rows in phased antenna array 36, thereby causing the phased antenna array to exhibit an excessively large lateral footprint itself. In order to mitigate these issues to minimize both the lateral footprint of phased antenna array 36 and the thickness T1 of antenna module 72, the antenna layers 86 in substrate 85 may be configured to have a higher dielectric permittivity than the transmission line layers 84 in substrate 85.

Figure 8:
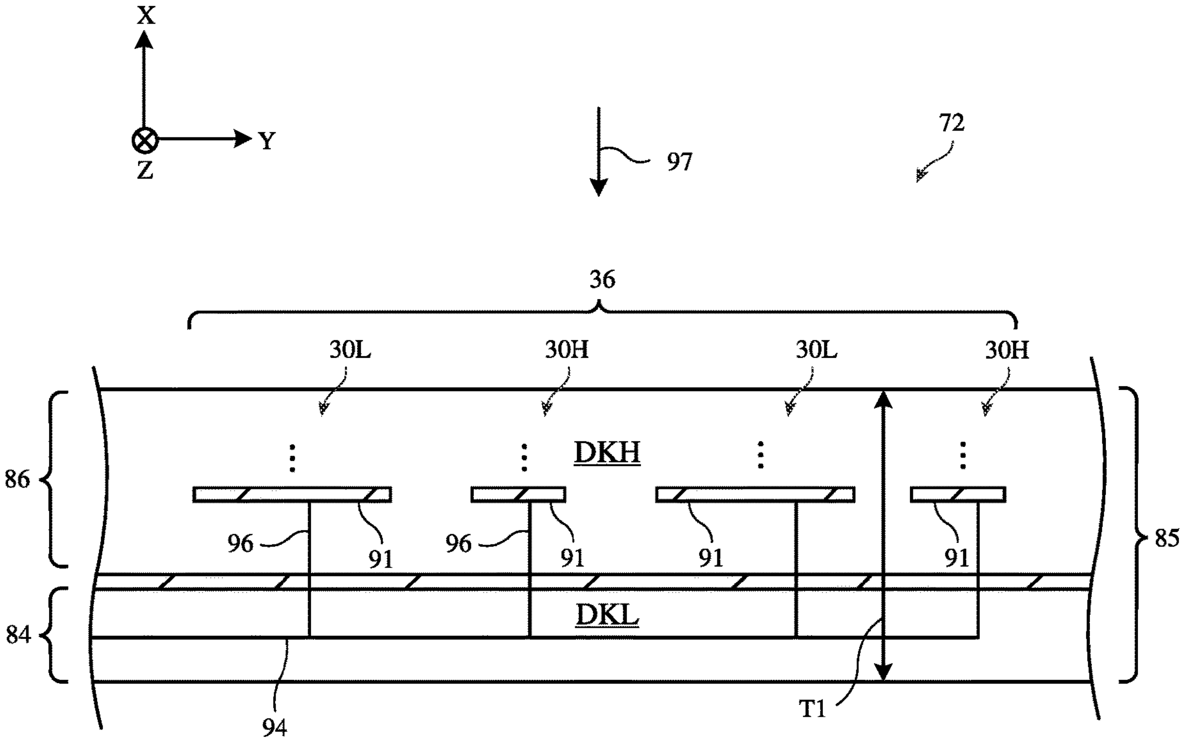
FIG. 8 is a cross-sectional side view of an illustrative antenna module having high-permittivity antenna layers in accordance with some embodiments.

FIG. 8 is a cross-sectional side view showing how antenna module 72 may be provided with antenna layers that have greater dielectric permittivity than transmission line layers 84. As shown in FIG. 8, the patch elements 91 of the antennas in phased antenna array 36 may be formed on (e.g., embedded within) antenna layers 86 (e.g., on a common one of the dielectric layers 80 in antenna layers 86 or on different dielectric layers 80 in antenna layers 86). Ground traces 82 may separate antenna layers 86 from transmission line layers 84 in substrate 85.

In the example of FIG. 8, phased antenna array 36 includes at least two antennas 30L that radiate in the low band and at least two antennas 30H that radiate in the high band. This is merely illustrative and, in general, phased antenna array 36 may include any desired number of antennas 30L and/or 30H, or any other desired antennas 30 for radiating in any desired frequency band(s). Antennas 30L and 30H need not be patch antennas and may, in general, be any desired type of antenna (e.g., patch elements 91 may be replaced with dipole antenna resonating elements, Yagi antenna resonating elements, slot antenna resonating elements, monopole antenna resonating elements, inverted-F antenna resonating elements, etc.

The transmission lines for antennas 30 may be embedded within transmission line layers 84. The transmission lines may include, for example, conductive traces 94 in transmission line layers 84. Conductive traces 94 may form the signal conductor 44 (FIG. 5) of one, more than one, or all of radio-frequency transmission line paths 32 (FIG. 4) for the antennas 30 in phased antenna array 36. If desired, additional grounded traces within transmission line layers 84 may form ground conductor 46 of the transmission lines (FIG. 5).

Conductive traces 94 of FIG. 8 may be coupled to the positive antenna feed terminals of antennas 30L and 30H (e.g., positive antenna feed terminals 50 of FIGS. 6 and 7) over vertical conductive structures 96. Vertical conductive structures 96 may extend through a portion of transmission line layers 84, holes or openings in ground traces 82, and some or all of antenna layers 86 to patch elements 91. Vertical conductive structures 96 may include conductive through-vias, metal pillars, metal wires, conductive pins, or any other desired vertical conductive interconnects.

In order to minimize the lateral footprint of patch elements 91 while still allowing patch elements 91 to cover the desired frequency bands of interest (e.g., the low and high bands), antenna layers 86 (e.g., each of the dielectric layers 80 of FIG. 7 in antenna layers 86) may be formed from a dielectric material having a relatively high dielectric permittivity DKH. Relatively high dielectric permittivity DKH may be defined by the particular material used to form antenna layers 86 and may be, for example, between 6.0 and 8.0, between 6.5 and 7.5, between 5.0 and 9.0, greater than 4.5, greater than 6.0, greater than 5.0, or any other desired permittivity greater than that of transmission line layers 84. In one suitable arrangement, antenna layers 86 may be formed using low-temperature co-fired ceramics (LTCC) or other ceramics, dielectrics, or printed circuit board materials having dielectric permittivity DKH.

At the same time, transmission line layers 84 (e.g., each of the dielectric layers 80 of FIG. 7 in transmission line layers 84) may be formed from a material that has a relatively low dielectric permittivity DKL (e.g., a different material than is used for antenna layers 86). Relatively low dielectric permittivity DKL is less than relatively high permittivity DKH and may be, for example, between 3.0 and 4.0, between 2.0 and 5.0, between 3.3 and 3.7, less than 4.0, less than 4.5, between 2.0 and 4.0, or any other desired permittivity less than permittivity DKH. In one suitable arrangement, transmission line layers 84 may be formed using low-temperature co-fired ceramics (LTCC) or other ceramics, dielectrics, or printed circuit board materials having dielectric permittivity DKL.

Increasing the dielectric permittivity of antenna layers 86 relative to transmission line layers 84 may serve to minimize the thickness T1 of antenna module 72 as well as the lateral footprint of each of the antennas in phased antenna array 36, while still allowing the antennas to cover frequency bands of interest. This may allow phased antenna array 36 to include a first set of antennas 30L for covering the low band and a second set of antennas 3011 for covering the high band that are interleaved with the first set of antennas 30L within a single row or column of the phased antenna array. Antennas 30L may sometimes be referred to herein as low band antennas 30L. Antennas 30H may sometimes be referred to herein as high band antennas 30H.

Figure 9:
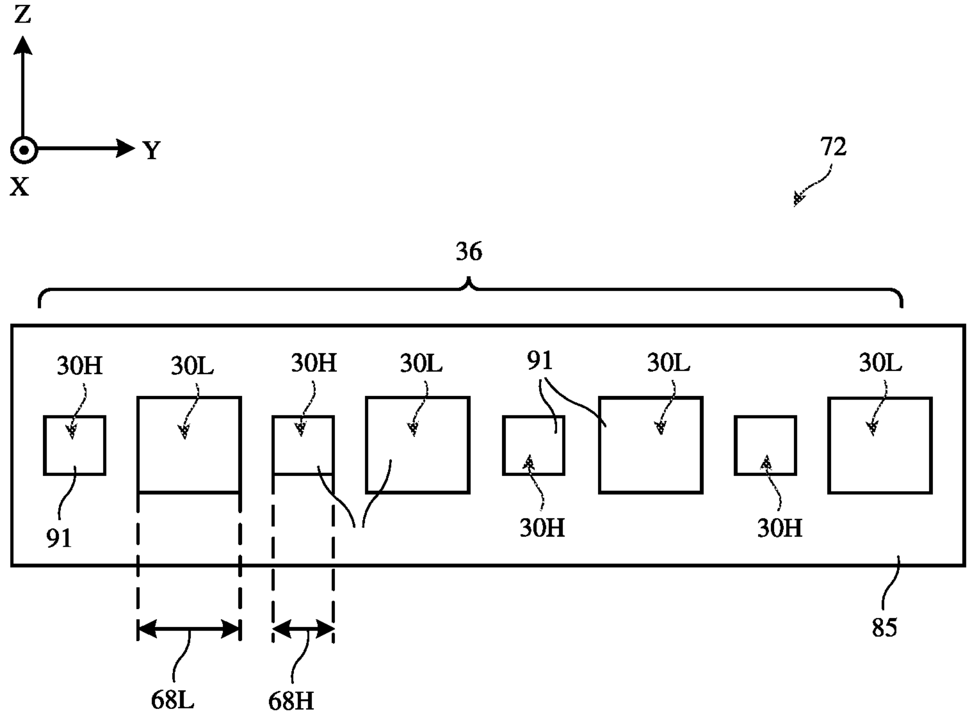
FIG. 9 is a top view showing how an illustrative antenna module having high-permittivity antenna layers may include interleaved high band and low band antennas in accordance with some embodiments.

FIG. 9 is a top-down view (e.g., as taken in the direction of arrow 97 of FIG. 8) showing how low band antennas 30L may be interleaved with high band antennas 30H within a single row of phased antenna array 36. As shown in FIG. 9, each high band antenna 30H may have one or more corresponding patch elements 91 that radiate in the high band and each low band antenna 30L may have one or more corresponding patch elements 91 that radiate in the low band.

Antennas 30H and 30L may be arranged in a single row. In other words, the center of the patch element(s) 91 in each low band antenna 30L may be aligned with the center of the patch element(s) 91 in each high band antenna 3011 along a common linear axis (e.g., extending parallel to the Y-axis of FIG. 9). High band antennas 30H may be interleaved with low band antennas 30L in the row. For example, all but one of the low band antennas 30L may be laterally interposed between a respective pair of high band antennas 30H and all but one of the high band antennas 30H may be laterally interposed between a respective pair of low band antennas 30L in phased antenna array 36.

Forming antenna layers 86 from material having relatively high dielectric permittivity DKH (FIG. 8) may reduce the length 68 of each antenna (FIG. 6) required for the antenna to cover its corresponding frequency band of interest relative to scenarios where lower dielectric permittivity materials are used. For example, the patch element(s) 91 in low band antennas 30L may have length 68L and the patch element(s) 91 in high band antennas 30H may have length 68H, each of which is shorter than the length would otherwise be in scenarios where the antenna layers have relatively low dielectric permittivity DKL. Forming antenna layers 86 from material having relatively high dielectric permittivity DKH (FIG. 8) therefore also reduces the lateral footprint of each high band antenna 30H and each low band antenna 30H (as well as the required distance between the center of adjacent low band antennas 30L and between the center of adjacent high band antennas 30H), thereby allowing both low band antennas 30L and high band antennas 30H to fit within the same row of phased antenna array 36 without undesirably interfering with each other.

In scenarios where the antenna layers have relatively low dielectric permittivity DKL, low band antennas 30L would need to be arranged in a separate row than high band antennas 30H in order for both sets of antennas to fit within antenna module 72 to cover the low and high bands, respectively. Reducing the lateral footprint and thickness of antenna module 72 using high dielectric permittivity antenna layers 86 may allow antenna module 72 to fit into spaces within device 10 that would otherwise be unavailable to the antenna module, such as a location for radiating through the inactive area of display 8 (FIG. 1), for radiating through apertures in peripheral conductive housing structures for device 10, etc.

The example of FIG. 9 in which phased antenna array 36 includes four low band antennas 30L and four high band antennas 30H is merely illustrative. In general, phased antenna array 36 may include any desired number of low band antennas 30L and any desired number of high band antennas 30H. If desired, phased antenna array 36 may include additional sets of antennas for covering additional bands. Each antenna may cover multiple bands if desired. The antennas may be arranged in any desired pattern and need not be interleaved. Patch elements 91 may have other shapes (e.g., cross-shapes, non-square rectangular shapes, etc.).

Figure 10:
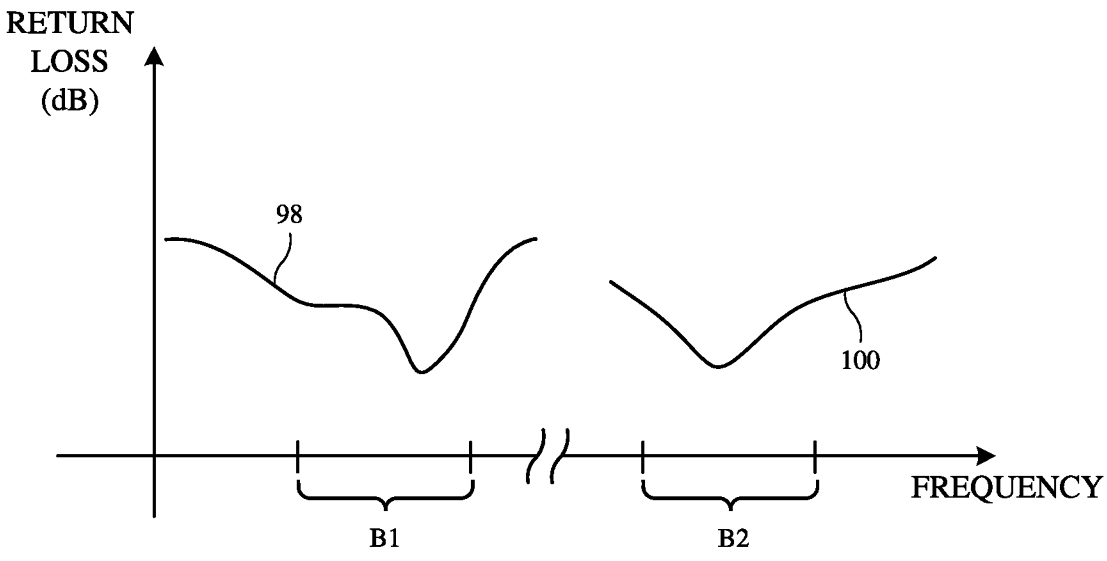
FIG. 10 is a plot of antenna performance (return loss) as a function of frequency for an illustrative antenna module having interleaved high band and low band antennas in accordance with some embodiments.

FIG. 10 is a plot of antenna performance (return loss) as a function of frequency for the antennas in phased antenna array 36. Curve 98 plots the return loss of low band antennas 30L. Curve 100 plots the return loss of high band antennas 30H. As shown by curve 98, low band antennas 30L may radiate with response peaks in low band B1 (e.g., at frequencies between 24.25 GHz and 29.5 GHz). As shown by curve 100, high band antennas 30H may radiate with response peaks in high band B2 (e.g., at frequencies between 37 GHz and 43.5 GHz). The antenna performance of low band antennas 30L and high band antennas 30H would be significantly deteriorated (e.g., the response peaks of curves 98 and 100 would be greatly diminished) in the low band and the high band if the antennas are interleaved in a single row of the phased antenna array while forming the antenna layers from materials having relatively low dielectric constant DKL. The example of FIG. 10 is merely illustrative. The antennas may radiate in any desired frequency bands greater than 10 GHz. Curves 98 and 100 may have other shapes in practice.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:

a dielectric substrate having a first set of dielectric layers with a first dielectric permittivity and having a second set of dielectric layers with a second dielectric permittivity that is greater than the first dielectric permittivity;

a ground trace on the dielectric substrate that separates the first set of dielectric layers from the second set of dielectric layers;

a phased antenna array having a first set of patch elements embedded in the second set of dielectric layers and having a second set of patch elements, wherein the first set of patch elements is configured to radiate in a first frequency band that includes frequencies greater than 10 GHz and the second set of patch elements is configured to radiate in a second frequency band that is higher than the first frequency band;

radio-frequency transmission lines having signal conductors embedded in the first set of dielectric layers, wherein the signal conductors are communicably coupled to the first and second sets of patch elements in the phased antenna array; and fences of conductive vias in the second set of dielectric layers and coupled to the ground trace on the dielectric substrate, wherein each patch element in the first set of patch elements is separated from an adjacent patch element in the second set of patch elements by a corresponding fence of conductive vias in the fences of conductive vias.

2. The electronic device of claim 1, wherein the first dielectric permittivity is less than 4.0 and the second dielectric permittivity is greater than 4.0.

3. The electronic device of claim 2, wherein the second dielectric permittivity is between 6.0 and 8.0.

4. The electronic device of claim 1, further comprising:

at least one opening in the ground trace; and conductive interconnect structures that extend through at least some of the first set of dielectric layers, the at least one opening, and at least some of the second set of dielectric layers, and that couple the signal conductors to positive antenna feed terminals on the first set of patch elements.

5. The electronic device of claim 1, wherein the first set of patch elements are interleaved with the second set of patch elements.

6. The electronic device of claim 5, wherein the second dielectric permittivity is greater than 6.0.

7. The electronic device of claim 6, wherein the first dielectric permittivity is less than 4.0.

8. The electronic device of claim 7, wherein the first frequency band comprises a frequency between 24.25 GHz and 29.5 GHz and the second frequency band comprises a frequency between 37 GHz and 43.5 GHz.

9. The electronic device of claim 1, wherein the second set of patch elements comprises a patch element laterally interposed between first and second patch elements in the first set of patch elements.

10. The electronic device of claim 1, wherein the first set of patch elements comprises a patch element laterally interposed between first and second patch elements in the second set of patch elements.

11. The electronic device of claim 1, wherein a center of each patch element in the first and second sets of patch elements are aligned along a common axis.

12. The electronic device of claim 1, further comprising:

beam steering circuitry configured to steer a first signal beam produced by the first set of patch elements in the first frequency band and configured to steer a second signal beam produced by the second set of patch elements in the second frequency band.

13. The electronic device of claim 1, wherein each patch element in the first and second sets of patch elements is patterned onto a common dielectric layer in the second set of dielectric layers.

14. The electronic device of claim 1, further comprising:

a radio-frequency integrated circuit mounted to the first set of dielectric layers, wherein the radio-frequency transmission lines are communicably coupled to the radio-frequency integrated circuit, the first set of dielectric layers with the first dielectric permittivity has first and second opposing surfaces, the first surface of the first set of dielectric layers faces the ground trace and the second set of dielectric layers, and the radio-frequency integrated circuit is mounted directly to the second surface of the first set of dielectric layers.

* * * * *